United States Patent
Anerousis et al.

(10) Patent No.: US 8,036,865 B2
(45) Date of Patent: Oct. 11, 2011

(54) SYSTEM AND METHOD FOR CONSTRUCTING FLEXIBLE ORDERING TO IMPROVE PRODUCTIVITY AND EFFICIENCY IN PROCESS FLOWS

(75) Inventors: Nikolaos Anerousis, Chappaqua, NY (US); Hani T. Jamjoom, White Plains, NY (US); Debanjan Saha, Mohegan Lake, NY (US); Ramendra K. Sahoo, Mohegan Lake, NY (US); Zon-Yin Shae, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 12/172,573

(22) Filed: Jul. 14, 2008

(65) Prior Publication Data

US 2010/0010791 A1 Jan. 14, 2010

(51) Int. Cl.
*G06G 7/48* (2006.01)
(52) U.S. Cl. .......................................................... 703/6
(58) Field of Classification Search ........................ None
See application file for complete search history.

(56) References Cited

U.S. PATENT DOCUMENTS

| | | | | |
|---|---|---|---|---|
| 5,870,545 | A * | 2/1999 | Davis et al. | 709/201 |
| 5,953,519 | A * | 9/1999 | Fura | 716/104 |
| 2006/0224432 | A1 * | 10/2006 | Li | 705/9 |
| 2007/0299795 | A1 * | 12/2007 | Macbeth et al. | 706/16 |

OTHER PUBLICATIONS

S. Carlsen, J. Krogstie, A. Slvberg, and O.I. Lindland. Evaluating exible workow systems. In Proc. HICSS-30), 1997.*

* cited by examiner

*Primary Examiner* — David Silver
(74) *Attorney, Agent, or Firm* — Ryan, Mason & Lewis, LLP

(57) ABSTRACT

A plurality of equivalent representations of a process are identified. The process has a plurality of tasks. Each of the representations specifies a different order of the tasks. The plurality of equivalent representations are consolidated into a single representation. The single representation captures, in at least one flexible order grouping, at least two of the tasks that may be performed in more than one order. At least one constraint is specified for the at least one flexible order grouping. Techniques for merging two or more flexible representations are also provided.

25 Claims, 8 Drawing Sheets

SYSTEM AND METHOD FOR CONSTRUCTING FLEXIBLE ORDERING TO IMPROVE PRODUCTIVITY AND EFFICIENCY IN PROCESS FLOWS

FIELD OF THE INVENTION

The present invention relates to the electrical, electronic and computer arts, and, more particularly, to computer-aided process modeling and the like.

BACKGROUND OF THE INVENTION

Processes, such as those in an enterprise, are typically captured in partially ordered flows. Each instance (or execution thread) is a totally ordered task list. While total-order unifies how a person executes a single task, it can introduce inefficiencies during multi-tasking activities. In many instances, tasks (within a process) can be executed in an out-of-order or flexi-order fashion. Note that "flexi" is used herein as shorthand for "flexible."

Traditional process models are quite rigid in encoding process flows. Specifically, current models are good at capturing partially ordered flows. A process diagram would basically say that Task A should be done before Task B. Additionally, branches, merges and decisions allow for different paths through the process to be followed.

SUMMARY OF THE INVENTION

Principles of the present invention provide techniques for constructing flexible ordering to improve productivity and efficiency in processes flows. In one aspect, an exemplary method (which can be computer implemented) for modeling a process flow includes the steps of identifying a plurality of equivalent representations of the process, the process having a plurality of tasks, each of the representations specifying a different order of the tasks; consolidating the plurality of equivalent representations into a single representation, wherein the single representation captures, in at least one flexible order grouping, at least two of the tasks that may be performed in more than one order: and specifying at least one constraint for the at least one flexible order grouping.

Another aspect of the invention includes a method for merging at least first and second flexible-order process flows, which are equivalent representations of an underlying process, to obtain a merged flow. Steps includes identifying a starting point of the first and second process flows; iteratively increasing the diameter from the starting point, to encompass at least one additional task with each iteration; and determining, for a given iteration, whether the at least one additional task is part of a flexible order grouping in at least one of the first and second flows. Further, an additional step includes checking whether the flexible order grouping can be maintained in the merged flow while satisfying the first and second flows, if it is determined that the at least one additional task is part of the flexible order grouping (if the additional task is not part of a flexi-order group in at least one of the presentations, its order would have to be strictly maintained in the merged model). Yet further, if it is determined that the flexible order grouping cannot be maintained in the merged flow while satisfying the first and second flows, an additional step includes removing the at least one additional task from the flexible order grouping, when forming the merged flow (if the flexible ordering can be maintained while satisfying both the first and second flows, it would normally be maintained in the merged model).

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention may offer one or more of the following technical benefits:
 ability to capture the most general way of the process
 easier way to describe variations across different instances
 automated merge and/or consolidation of multiple processes executing the same task
 more flexibility for a resource scheduler to decide the best task execution based on the current load.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

In reality, flows can be much more flexible (in terms of execution order) than what is allowed by current modeling tools. For instance, Tasks A, B, and C may need to be executed (in any order) within a pre-specified deadline (or constraint). Capturing this flexibility, according to one or more embodiments of the invention, allows systems to enhance, and even to optimize, multi-tasking activities. Looking at traditional models, it will be appreciated that multiple challenges are raised in providing users with a precise, yet easy to follow, methodology for capturing the flexibility in execution order and the criticality of execution time. In addition to human users, one or more inventive embodiments also provide modeling techniques that can be beneficial to automatic process optimization program code in scheduling the process and reducing, or even minimizing, one or more of time, cost, and so on (alternatively, there may be other parameters that it is desirable to increase, or even maximize, such as profits). Further, one or more inventive embodiments provide flexibility in specifying different kinds of constraints.

Because one or more inventive models may, in at least some instances, be followed by multiple users, possibly in disconnected operations, one or more embodiments of the inventive methodology also support reconciliation of such models as different users (who have possibly completed portions of the tasks) rejoin the group. Consider, for example, a flexi-ordered process with different users and/or workers assigned to one or more tasks. Then, if the different users have completed portions of the process (which essentially forms a flexi-ordered process or completed tasks), when these users reconnect (i.e., are no longer in disconnected mode) with regard to the application that is doing the tracking of process execution, one or more embodiments of the invention address how their completed tasks are combined across all users participating in completing the process, and how any constraints are recomputed.

One or more embodiments of the invention provide constrained out-of-order process execution, both in the context of shared authoring, as well as process tracking. This advantageously provides a tool for the process designer to include hint(s) and/or direction(s) directly into the process flow, to allow the flow execution program to easily enhance, or even optimize, the process, based on the real time condition(s). A flow execution program can also be referred to as a workflow engine. Non-limiting examples of such a flow execution program or workflow engine include IBM WEBSPHERE® PROCESS SERVER software and IBM TIVOLI® MAXIMO software, both available from International Business Machines Corporation ("IBM"), Armonk, N.Y., USA (registered marks of IBM).

In one or more embodiments, the processes and flows are associated with an enterprise.

Figure 1:
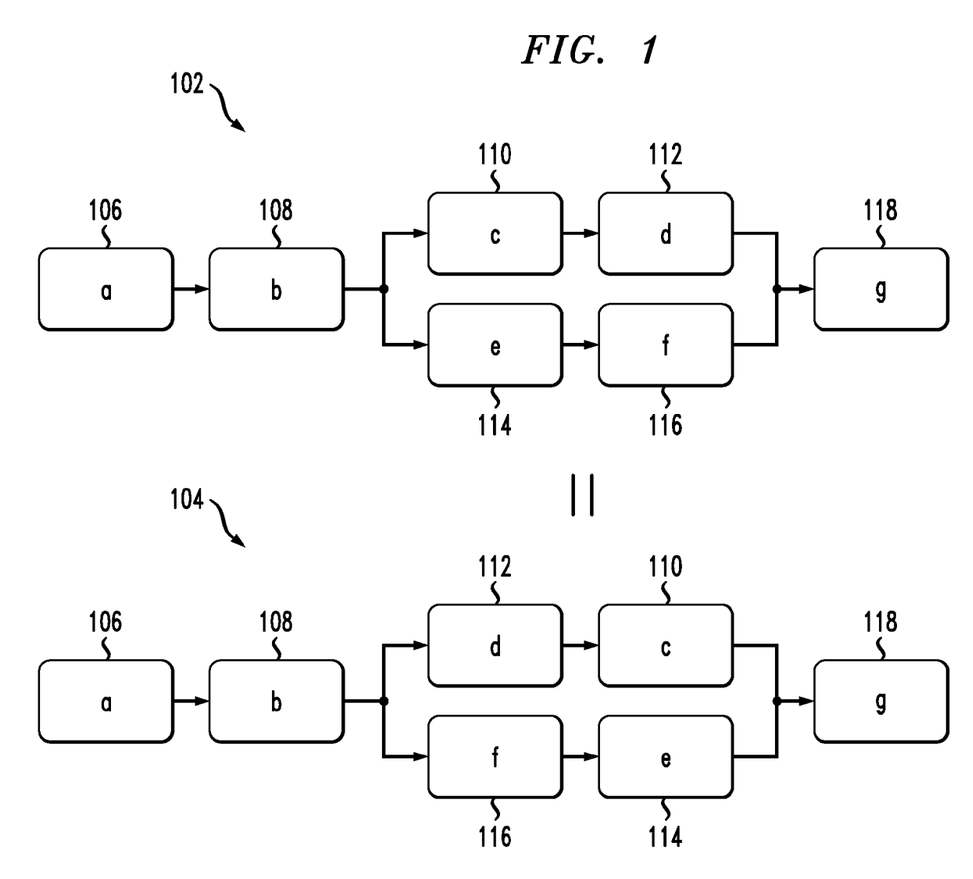
FIG. 1 shows two representations of a process, which can be incorporated into a single representation using exemplary inventive techniques.

One beneficial aspect of the invention is a modeling methodology. Attention should now be given to FIG. 1, which depicts two example processes, 102 and 104. Processes 102 and 104 may be equivalent representations of a single underlying process; that is, they may depict slightly different ways in which the same process can be carried out to reach the same desired result. Thus, in general terms, an inventive method step can include identifying a plurality of equivalent representations of a process (here, representations 102 and 104). The process has a plurality of tasks 106, 108, 110, 112, 114, 116, 118, also identified as tasks a though g, respectively. Each of the representations may specify a different order of the tasks. For example, in FIG. 1, tasks c and d, 110 and 112; and tasks e and f, 114 and 116; can be executed in any order.

Figure 2:
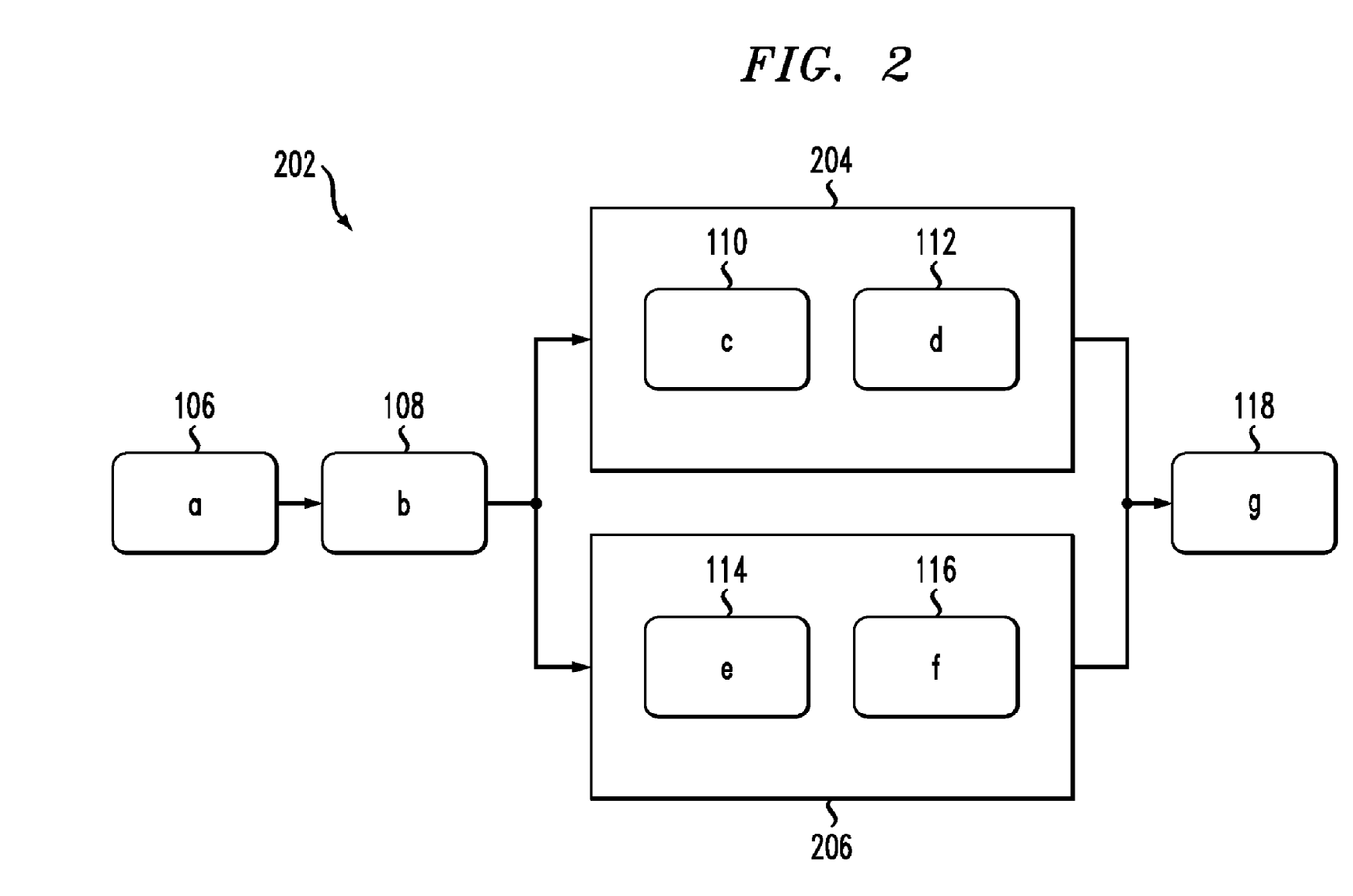
FIG. 2 shows an exemplary single representation of the two representations of FIG. 1, according to one aspect of the invention.

With regard now to FIG. 2, in one aspect, embodiment(s) of the present invention allow for consolidating the aforementioned plurality of equivalent representations into a single representation. An example of such a representation is shown at 202 in FIG. 2. Representation 202 is essentially "saying" that tasks c 110 AND d 112 need to be completed before task g 118 can be performed; similarly for tasks e 114 and f 116. However, while tasks c 110 and d 112 both need to be done before task g 118, they can be done in any order (again, the same is true for tasks e 114 and f 116). The single representation 202 thus captures at least two of the tasks that may be performed in more than one order (in this specific example, four tasks in two groups of two). In the example of FIG. 2, the indicated generality is captured in "flexible order boxes" 204, 206; in general terms the method employs at least one such box. Further, while the examples depicted in the figures make use of boxes, in general terms, the generality may be captured by symbols other than boxes, which are generically termed "flexible order groupings."

It should be noted at this point that, as with any process specification, there is an associated lifecycle with regard to process specification in accordance with one or more inventive techniques. At the concept level, the process representations mentioned herein can be drawings (by hand and/or electronically, such as with a computer-aided design (CAD) program). The initial drawings can be used, for example, for training purposes and/or as a reference document. At the execution level, the inventive process representations will need to be specified using an appropriate process execution language. Inventive implementations can employ, for example, new software tools or extensions to existing modeling and/or workflow software tools. One appropriate approach is to make use of Business Process Execution Language (BPEL), supplemented by custom-programmed extensions using languages such as C, C++, Java, Perl, or the like. BPEL per se is not general enough to capture inventive flexible ordering, and thus, existing process execution language should be extended, or new code created, to allow for inventive flexible-ordering constructs.

The following non-limiting example is presented to further illustrate aspects of the invention. Consider a personal computer (PC) configuration process where multiple software components need to be installed and/or configured. In many cases, the configuration process many require different types of expertise (for example, a database administrator and a mail server administrator). The tasks of the two administrators, however, can be done in any order depending on the availability of the users. Nevertheless, only one person can work on the PC. Traditional processes need to serialize these tasks, specifying one ordering. However, one or more embodiments of the invention allow the ordering to be kept undefined to allow for greater execution flexibility.

Figure 3:
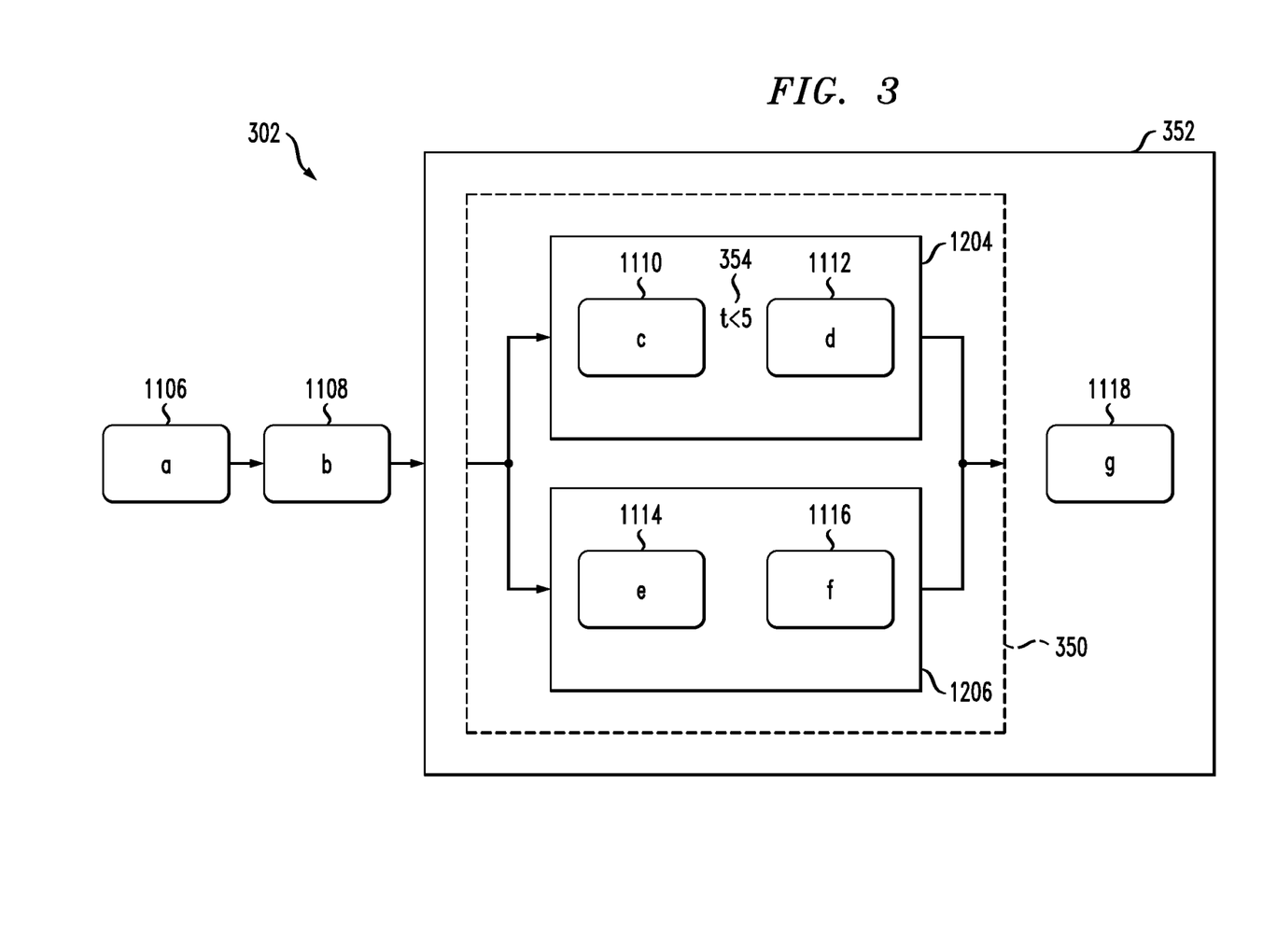
FIG. 3 shows an exemplary representation of an "OR" function, according to another aspect of the invention.

As shown in FIG. 3, in one or more embodiments of the invention, the OR operation can also be captured. Here, the process 302 is "saying" that task g 1118 can also happen before tasks c, d 1110, 1112 or tasks e, f 1114, 1116. Since process 302 allows a different order than the processes previously described, tasks a through g in FIG. 3 have been re-numbered as even numbers 1106 through 11 18 respectively. Further, flexi-boxes 204, 206 have been renumbered as 1204, 1206 respectfully. A dotted flexi-box 350 is used to group tasks c 1110, d 1112, e 1114, and f 1116 in flexi-boxes 1204, 1206, into a single group that forms one argument of the "OR." Task g 1118 forms the other argument of the "OR"; this is indicated by flexi-box 352. By way of review and provision of further comments, "OR" as used herein refers to execution of two or more steps in any order, while "AND" as used herein refers to execution of all steps in any order. Stated in another way, if a flexible order grouping contains at least three tasks and specifies that all three of the tasks can be performed in any order, this constitutes an example of an "AND" function, while if a flexible order grouping contains three or more tasks and specifies that at least two, but less than all of, the tasks in the flexible order grouping can be performed in any order, this constitutes an example of an "OR" function.

Another aspect of the invention allows specifying at least one constraint for the at least one flexible order box; in general terms, each flexi-order box may, but need not necessarily, specify a constraint. For instance, suppose c 1110 and d 1112 in flexi-box 1204 should be completed in less than 5 min. This is denoted at 354 in FIG. 3. With constraints, each task can be given a priority to help assist the decision making process. In some instances, the constraints can be specified in models implemented in BPEL, supplemented by custom-programmed extensions, as discussed above. Time is but one possible constraint (e.g., execute as many steps as possible within the next 5 minutes)—other exemplary constraints include cost (e.g., execute as many steps as possible, as long as the cost is less than a specific amount; this may vary based on the execution geography (such as US vs. India)), resource availability, wait time, and the like.

Figure 4:
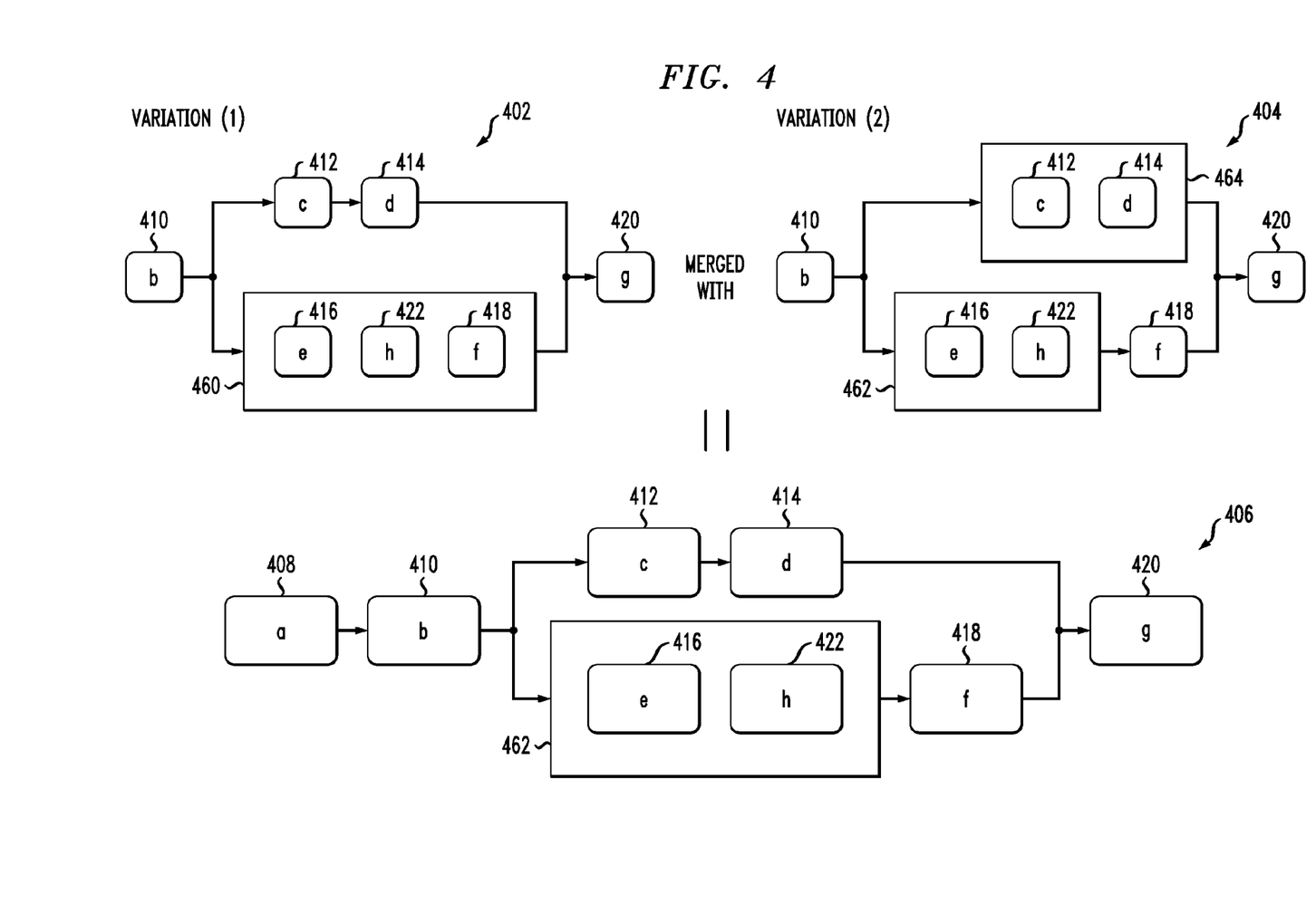
FIG. 4 shows the merger of two process representations, each of which itself employs exemplary inventive techniques, according to yet another aspect of the invention.

Yet another aspect of the invention allows for merging two or more inventive flexi-order models, each of which models the same process in equivalent fashion. An example of this is shown in FIG. 4. First flexi-order model 402 and second flexi-order model 404 are merged to form merged flexi-order model 406. The models address steps a through g, numbered, respectively, using even numbers 408 through 420. Step a 408 is omitted from models 402 and 404 for clarity, but is present prior to step b 410 in each case.

In variation (1), model 402, steps c 412 and d 414 must be performed in the indicated order, prior to step g 420. Steps e 416, h 422, and f 418 can be performed in any order, as indicated by flexi-box 460, but must be performed prior to step g 420. In variation (2), model 404, steps c 412 and d 414 can be performed in any order prior to step g 420, as indicated by flexi-box 464. Further, steps e 416 and h 422 can be performed in any order prior to step f 418, as indicated by flexi-box 462.

The merged model 406 requires steps c 412 and d 414 to be performed in order, since this satisfies both model 402 and model 404. Further, the merged model 406 allows steps e 416 and h 422 to be performed in any order prior to step f 418, as indicated by flexi-box 462, since this satisfies both model 404 and model 402.

There are multiple (and efficient) ways of doing this type of merger, while taking into account the constraints. One manner, involving an iterative approach, is as follows. Take the starting points of the processes to be combined, and iteratively increase the diameter (number of tasks to include). For each increase, if the task is part of a flexi-order group, check if the ordering can be maintained or strict ordering needs to be enforced. Thus, with regard to FIG. 4, we would start at step a 408 for each variation (step a 408 is omitted from 402 and 404 for brevity), then take a diameter of one, which would encompass step b 410, not part of a flexible order group in either variation. The diameter would then be increased to two, which would encompass steps c 412 and e 416. At this point, it would be noted that step c 412 is not part of a flexible order group in 402 but is in 404; since 402 requires strict ordering, it is known that flexible order group 464 cannot be maintained in the merged model 406. Two further iterations bring the diameter to three, encompassing d 414 and h 422, followed by a diameter of four, encompassing f 418 and g 420. At this point, it is noted that generality can be preserved in ordering e 416 and h 422, as this satisfies both 402 and 404, but f 418 must be executed after e 416 and h 422, such that the merged model 406 has only flexi-group 462.

Figure 5:
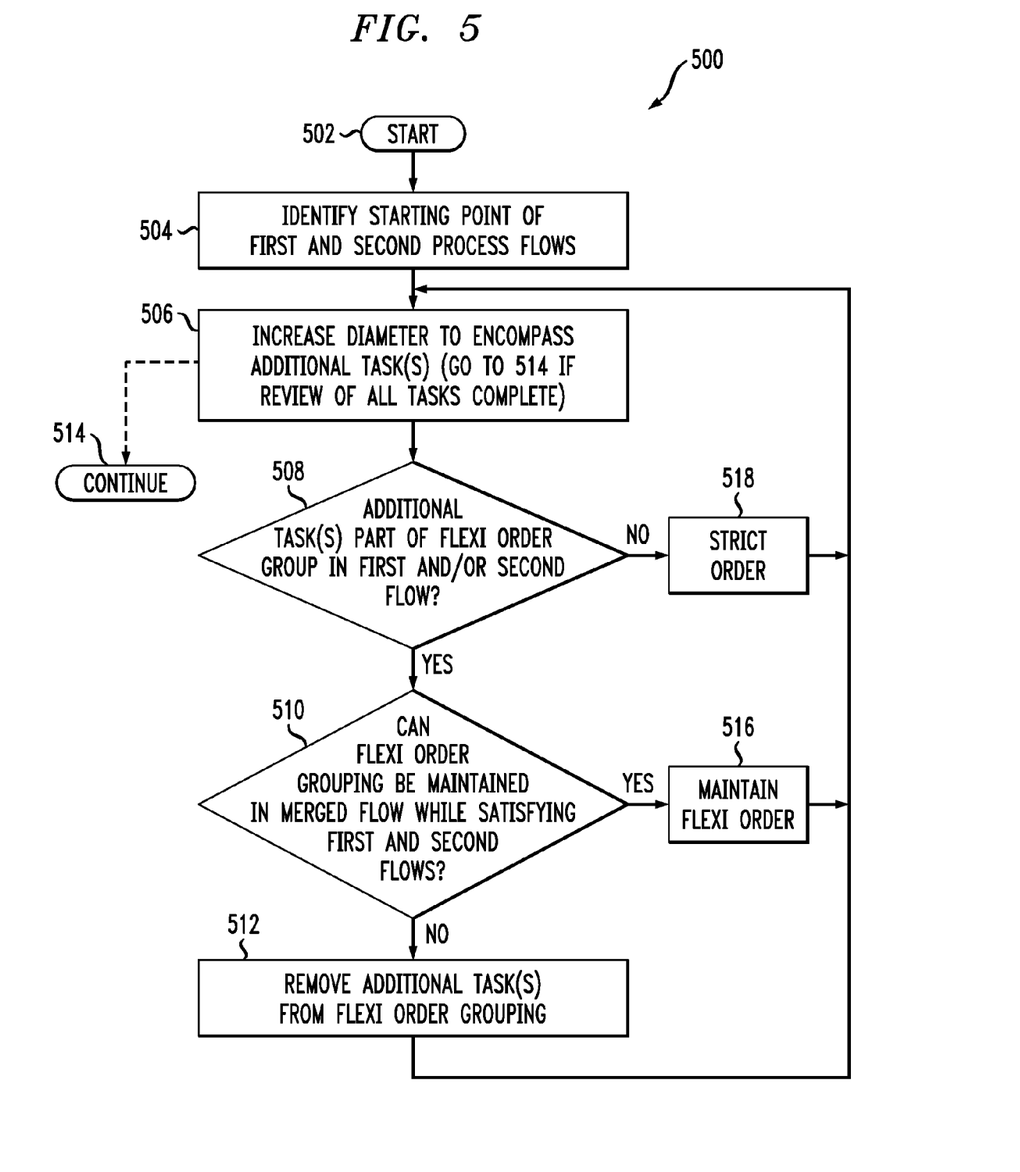
FIG. 5 shows a flow chart of exemplary method steps, according to a further aspect of the invention.

Accordingly, with continued reference to FIG. 4, and referring also now to FIG. 5, another aspect of the invention includes a method 500 for merging at least first and second flexible-order process flows, which are equivalent representations of an underlying process, to obtain a merged flow. After beginning at 502, steps include identifying a starting point of the first and second process flows, as at 504; iteratively increasing the diameter from the starting point, to encompass at least one additional task with each iteration, as at 506 (with looping discussed below); and determining, for a given iteration, whether the at least one additional task is part of a flexible order grouping in at least one of the first and second flows, as at decision block 508. Further, an additional step 510 includes checking whether the flexible order grouping can be maintained in the merged flow while satisfying the first and second flows, if it is determined that the at least one additional task is part of the flexible order grouping (that is, "YES" branch of block 508 is followed). Note, if the additional task is not part of a flexi-order group in at least one of the presentations, its order would have to be strictly maintained in the merged model, as per block 518 and "NO" branch of block 508.

Yet further, if it is determined that the flexible order grouping cannot be maintained in the merged flow while satisfying the first and second flows, as per the "NO" branch of block 510, an additional step 512 includes removing the at least one additional task from the flexible order grouping, when forming the merged flow. If the flexible ordering can be maintained while satisfying both the first and second flows, as per "YES" branch of block 510 and block 516, it would normally be maintained in the merged model. In each case, processing ultimately returns to block 506, as indicated by the arrows from blocks 518, 516, 512; however, although a separate decision block is omitted for clarity, once review of all tasks is complete, processing flows to "CONTINUE" block 514.

In view of the foregoing, it will be appreciated that one or more embodiments of the invention provide a method, system, and computer program product for describing flexi-order processes and for expressing constraints in a flexi-order process. Further, one or more embodiments of the invention provide a method, system, and computer program product for using flexi-orders (that is, process description with flexible ordering according to one or more embodiments of the invention) to schedule resources to minimize overhead due to context switching; the following is a non-limiting example. Consider the process in FIG. 2 and assume that "User X" is responsible for completing tasks a 106 and b 108. Both tasks are required for each process request. Now consider two process requests (req_1 and req_2). "User X" can perform tasks a, b for req_1 (denoted as a_1, b_1) and tasks a, b for req_2 (denoted as a_2, b_2). Because these are two different requests, depending on the type of work, it might be beneficial to perform a_1, a_2, b_1, b_2 (possibly because switching between requests is much lower overhead than switching tasks). In other cases, it could be beneficial to perform a_1, b_1, b_2, a_2. With flexi-orders, according to one or more embodiments of the invention, these combinations are allowed, enabling reduction and even minimization of any overhead associated with switching between tasks and requests.

Figure 6:
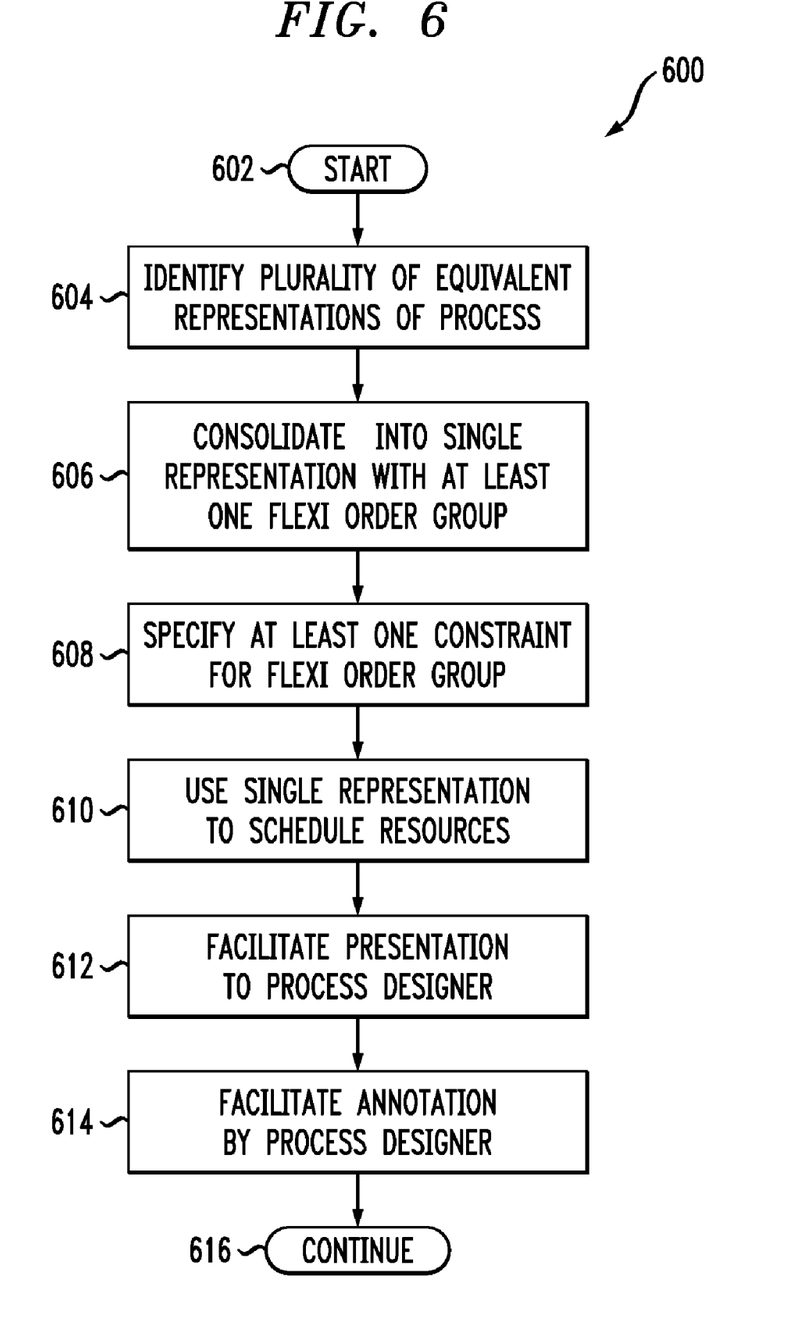
FIG. 6 shows a flow chart of exemplary method steps, according to a still further aspect of the invention.

Thus, with reference to FIG. 6, a method 600, for modeling a process flow, begins at block 602. Step 604 includes identifying a plurality of equivalent representations of the process, the process having a plurality of tasks, each of the representations specifying a different order of the tasks. Step 606 includes consolidating the plurality of equivalent representations into a single representation. The single representation captures, in at least one flexible order grouping, at least two of the tasks that may be performed in more than one order. Step 608 includes specifying at least one constraint for the at least one flexible order grouping.

In some instances, the different orders of the tasks specified by the plurality of equivalent representations are fixed orders. Each of the tasks might be associated with at least one of a plurality of resources, in which case an additional step 610 includes using the single representation to schedule the resources (for example, so as to reduce overhead due to context switching). The single representation may achieve the reduced overhead due to context switching by allowing performance of a first task for a first request followed by a first task for a second request, before performance of a second task for the first request. The first task for the first request and the first task for the second request may have a similar context.

Additional optional steps include facilitating presentation of the single representation to a process designer, as at block 612, and facilitating annotation of the single representation by the process designer, as at block 614. The annotation may include, for example, hints and/or directions. The annotations may be based, at least in part, on real-time conditions.

In some instances, the flexible order grouping contains at least three of the tasks and the flexible order grouping specifies that all three of the tasks in the flexible order grouping can be performed in any order. In other instances, the flexible order grouping contains at least three of the tasks and the flexible order grouping specifies that at least two, but less than all of, the tasks in the flexible order grouping can be performed in any order. Of course, these are only non-limiting examples.

Processing continues at block 616. One or more embodiments of the invention thus also provide a method, system, and computer program product for a process designer to provide and include hints and/or directions directly into the process flow, to allow the flow execution program to easily enhance, and even optimize, the process, based on real time conditions.

Figure 8:
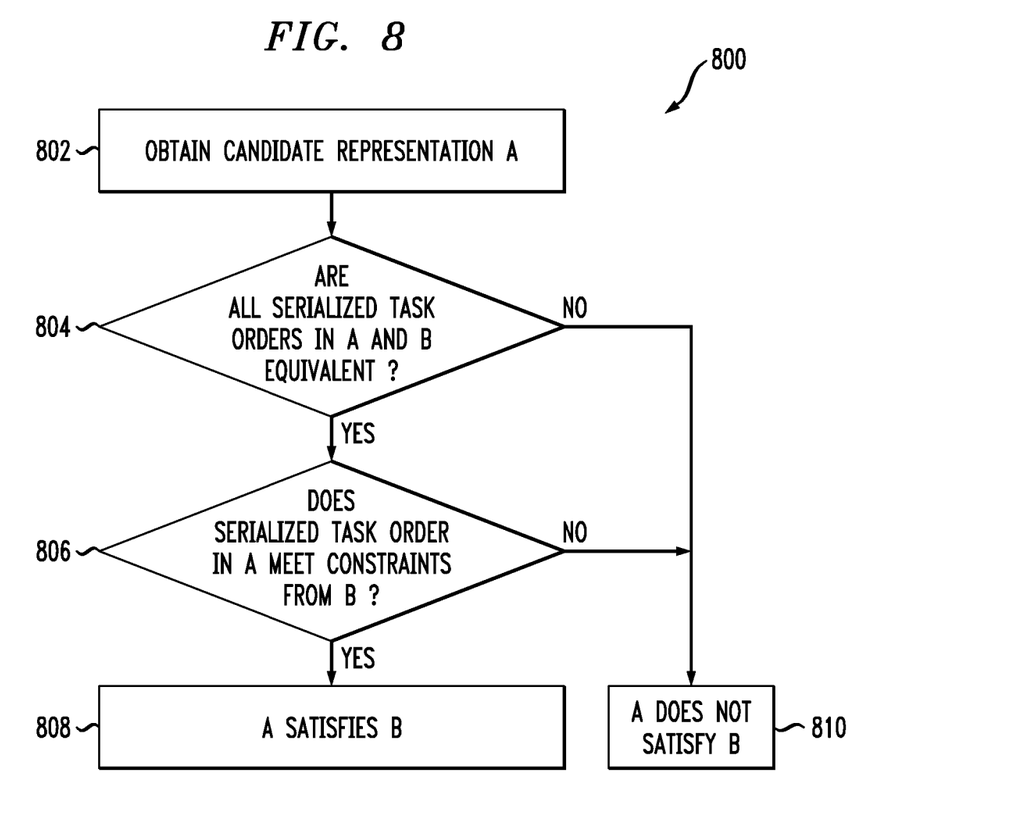
FIG. 8 shows a flow chart of exemplary method steps, according to an additional aspect of the invention.

Yet further, as described with regard to FIG. 4 above, one or more embodiments of the invention provide a method, system, and computer program product for merging two or more flexi-order processes and deriving the most general flexi-order process that satisfies all merged processes. Even further, with reference also to FIG. 8, one or more embodiments of the invention provide a method, system, and computer program product for checking the satisfiablility of a process against a flexi-order process. Satisfiability is defined as follows: given processes A and B, A satisfies B if and only if for every serialized task ordering in process A, there is (i) an equivalent serialized ordering in process B, and (ii) the given serialized ordering in A meets or exceeds all constraints as specified by process B. Optional method steps 800 can be performed independently, or in connection with the method of FIG. 6. For illustrative purposes, the single representation referred to in connection with FIG. 6 may be referred to as representation B. As shown in FIG. 8, step 802 includes obtaining a candidate representation A, the candidate representation having at least one serialized task order. Step 804 includes determining whether representation B is an equivalent serialized task order to the at least one serialized task order in the candidate representation A (for every serialized task ordering in process A). Step 806 includes, responsive to determining that the representation B is an equivalent serialized task order to the at least one serialized task order in the candidate representation A (YES branch of block 804), determining whether the serialized task order in the candidate representation A at least meets any constraints specified in the representation B. Step 808 includes, responsive to determining that the serialized task order in the candidate representation A at least meets any constraints specified in the representation B (YES branch of block 806), determining that the candidate representation A satisfies the process specified by the representation B. "START" and "CONTINUE" blocks are omitted from FIG. 8 since it can be performed independently, or in conjunction with the steps of FIG. 6. Where either decision block is violated, a conclusion can be made, as at block 810, that A does not satisfy B.

One non-limiting example of the types of processes to which techniques of the present invention can be applied is internal information technology (IT) processes in an enterprise, including improving methodology and/or tooling associated with such processes. Thus, an aspect of the invention includes employing methods, systems, and/or computer program products in accordance with the invention to represent process flows and to then improve the flows, the representations of the flows, the methodology of the flows, and/or tools associated with the flows, and the like, based at least in part upon the inventive methods, systems, and/or computer program products. Thus, tangible results that may be obtained using one or more techniques of the invention include improved processes, improved representations of processes (for decision making), and/or enterprises or other systems operated in accordance with the improved processes and/or representations thereof.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 7:
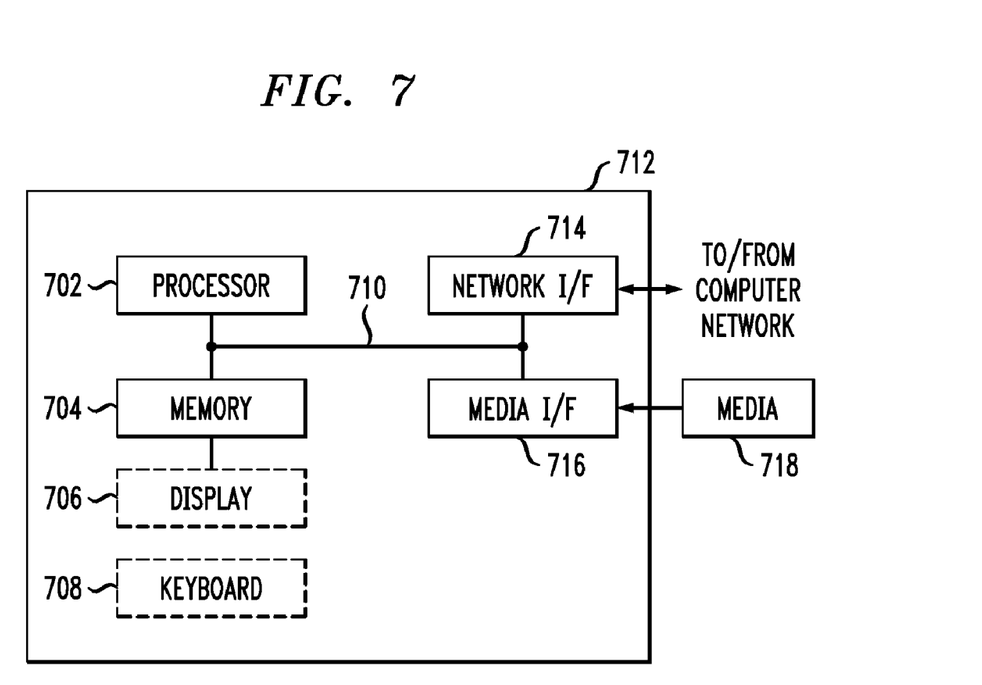
FIG. 7 depicts a computer system that may be useful in implementing one or more aspects and/or elements of the present invention.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU.

Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 704), magnetic tape, a removable computer diskette (for example media 718), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for modeling a process flow, said method comprising the steps of:

identifying a plurality of equivalent representations of said process, said process having a plurality of tasks, each of said representations specifying a different order of said tasks;

consolidating said plurality of equivalent representations into a single representation, wherein said single representation captures, in at least one flexible order grouping, at least two of said tasks that may be performed in more than one order; and specifying at least one constraint for said at least one flexible order grouping, wherein one or more of said steps are performed by a hardware device.

2. The method of claim 1, wherein said different orders of said tasks specified by said plurality of equivalent representations comprise fixed orders.

3. The method of claim 1, wherein each of said tasks is associated with at least one of a plurality of resources, further comprising the additional step of using said single representation to schedule said resources so as to reduce overhead due to context switching.

4. The method of claim 3, wherein said single representation achieves said reduced overhead due to context switching by allowing performance of a first task for a first request followed by a first task for a second request, before performance of a second task for said first request, wherein said first task for said first request and said first task for said second request have a similar context.

5. The method of claim 1, further comprising the additional steps of:

facilitating presentation of said single representation to a process designer; and facilitating annotation of said single representation by said process designer.

6. The method of claim 5, wherein said annotation comprises at least one of hints and directions.

7. The method of claim 6, wherein said annotations are based, at least in part, on real-time conditions.

8. The method of claim 1, wherein said flexible order grouping contains at least three of said tasks and wherein said flexible order grouping specifies that all three of said tasks in said flexible order grouping can be performed in any order.

9. The method of claim 1, wherein said flexible order grouping contains at least three of said tasks and wherein said flexible order grouping specifies that at least two, but less than all of, said tasks in said flexible order grouping can be performed in any order.

10. The method of claim 1, wherein said single representation is designated as representation B, further comprising the additional steps of:

obtaining a candidate representation A, said candidate representation having at least one serialized task order;

determining whether representation B comprises an equivalent serialized task order to said at least one serialized task order in said candidate representation A;

responsive to determining that said representation B comprises an equivalent serialized task order to said at least one serialized task order in said candidate representation A, determining whether said serialized task order in said candidate representation A at least meets any constraints specified in said representation B; and responsive to determining that said serialized task order in said candidate representation A at least meets any constraints specified in said representation B, determining that said candidate representation A satisfies said process specified by said representation B.

11. A method for merging at least first and second flexible-order process flows, each comprising an equivalent representation of an underlying process, to obtain a merged flow, said method comprising the steps of:
- identifying a starting point of said first and second process flows;
- iteratively increasing a diameter from said starting point, to encompass at least one additional task with each iteration;
- determining, for a given iteration, whether said at least one additional task is part of a flexible order grouping in at least one of said first and second flows;
- responsive to determining that said at least one additional task is part of said flexible order grouping, checking whether said flexible order grouping can be maintained in said merged flow while satisfying said first and second flows; and
- responsive to determining that said flexible order grouping cannot be maintained in said merged flow while satisfying said first and second flows, removing said at least one additional task from said flexible order grouping, when forming said merged flow, wherein one or more of said steps are performed by a hardware device.

12. A computer program product comprising a tangible computer useable readable recordable storage medium including computer usable program code for merging at least first and second flexible-order process flows, each comprising an equivalent representation of an underlying process, to obtain a merged flow, said computer program product including:
- computer usable program code for identifying a starting point of said first and second process flows;
- computer usable program code for iteratively increasing a diameter from said starting point, to encompass at least one additional task with each iteration;
- computer usable program code for determining, for a given iteration, whether said at least one additional task is part of a flexible order grouping in at least one of said first and second flows;
- computer usable program code for, responsive to determining that said at least one additional task is part of said flexible order grouping, checking whether said flexible order grouping can be maintained in said merged flow while satisfying said first and second flows; and
- computer usable program code for, responsive to determining that said flexible order grouping cannot be maintained in said merged flow while satisfying said first and second flows, removing said at least one additional task from said flexible order grouping, when forming said merged flow.

13. A computer program product comprising a tangible computer useable readable recordable storage medium including computer usable program code for modeling a process flow, said computer program product including:
- computer usable program code for identifying a plurality of equivalent representations of said process, said process having a plurality of tasks, each of said representations specifying a different order of said tasks;
- computer usable program code for consolidating said plurality of equivalent representations into a single representation, wherein said single representation captures, in at least one flexible order grouping, at least two of said tasks that may be perfolined in more than one order; and
- computer usable program code for specifying at least one constraint for said at least one flexible order grouping.

14. The computer program product of claim 13, wherein said different orders of said tasks specified by said plurality of equivalent representations comprise fixed orders.

15. The computer program product of claim 13, wherein each of said tasks is associated with at least one of a plurality of resources, further comprising computer usable program code for using said single representation to schedule said resources so as to reduce overhead due to context switching.

16. The computer program product of claim 15, wherein said single representation achieves said reduced overhead due to context switching by allowing performance of a first task for a first request followed by a first task for a second request, before performance of a second task for said first request, wherein said first task for said first request and said first task for said second request have a similar context.

17. The computer program product of claim 13, further comprising:
- computer usable program code for facilitating presentation of said single representation to a process designer; and
- computer usable program code for facilitating annotation of said single representation by said process designer.

18. The computer program product of claim 17, wherein said annotation comprises at least one of hints and directions.

19. The computer program product of claim 18, wherein said annotations are based, at least in part, on real-time conditions.

20. A system for modeling a process flow, said system comprising:
- a memory; and
- at least one processor, coupled to said memory, and operative to
  - identify a plurality of equivalent representations of said process, said process having a plurality of tasks, each of said representations specifying a different order of said tasks;
  - consolidate said plurality of equivalent representations into a single representation, wherein said single representation captures, in at least one flexible order grouping, at least two of said tasks that may be performed in more than one order; and
  - specify at least one constraint for said at least one flexible order grouping.

21. The system of claim 20, wherein said different orders of said tasks specified by said plurality of equivalent representations comprise fixed orders.

22. The system of claim 20, wherein each of said tasks is associated with at least one of a plurality of resources, and wherein said processor is further operative to use said single representation to schedule said resources so as to reduce overhead due to context switching.

23. The system of claim 22, wherein said single representation used by said processor achieves said reduced overhead due to context switching by allowing performance of a first task for a first request followed by a first task for a second request, before performance of a second task for said first request, wherein said first task for said first request and said first task for said second request have a similar context.

24. The system of claim 20, wherein said processor is further operative to:
- facilitate presentation of said single representation to a process designer; and
- facilitate annotation of said single representation by said process designer.

25. The system of claim 24, wherein said annotation comprises at least one of hints and directions.

* * * * *